United States Patent [19]

Köber

[11] 4,286,467

[45] Sep. 1, 1981

[54] METHOD OF SELECTING ROLLERS FOR HIGH-SPEED JOURNAL BEARINGS

[75] Inventor: Hans Köber, Schwebheim, Fed. Rep. of Germany

[73] Assignee: FAG Kugelfischer Georg Schäfer & Co., Schweinfurt, Fed. Rep. of Germany

[21] Appl. No.: 110,741

[22] Filed: Jan. 9, 1980

[30] Foreign Application Priority Data

Jan. 10, 1979 [DE] Fed. Rep. of Germany ....... 2900663

[51] Int. Cl.[3] ...................... G01M 1/16; G01M 13/04

[52] U.S. Cl. ........................................ 73/460; 73/593

[58] Field of Search .................... 73/66, 460, 462, 593

[56] References Cited

U.S. PATENT DOCUMENTS

| | | | |
|---|---|---|---|
| 2,012,780 | 8/1935 | Taylor | 73/462 X |
| 2,758,487 | 8/1956 | Erickson | 73/66 X |
| 3,207,979 | 9/1965 | Perkins | 73/462 X |

*Primary Examiner*—James J. Gill

*Attorney, Agent, or Firm*—Karl F. Ross

[57] ABSTRACT

Rollers for a high-speed journal bearing are tested for any unbalance before assembly by being rotated at high velocity while lodged in a movably supported air bearing. Rollers with a dynamic unbalance above a predetermined limit are rejected.

1 Claim, 5 Drawing Figures

10

11

12

4

0

6

9

8

7

SENSOR

13

METHOD OF SELECTING ROLLERS FOR HIGH-SPEED JOURNAL BEARINGS

FIELD OF THE INVENTION

My present invention relates to a method of selecting cylindrical or other rollers for assembly into high-speed journal bearings, e.g. as used in engines designed for air or space travel.

BACKGROUND OF THE INVENTION

In high-speed machinery with shafts rotating at elevated velocities, e.g. of 200,000 RPM, journal bearings supporting these shafts must operate with great precision and minimum wear. Various tests have therefore been devised for checking the components of such bearings, especially the rotary bodies thereof, in order to facilitate selection of only those whose dimensions and other structural parameters conform within narrow tolerances to predetermined standards. Such tests and equipment suitable therefor have been described in an article by W. Kirchner entitled *Das Messen und Sortieren von Walzkorpern fur Prazisionswalzlager, first published in the magazine "TZ fur praktische Metallbearbeitung", vol.* 58 (1964), No. 12, pages 679–684, by Technischer Verlag Günter Grossmann GmbH, Stuttgart-Vaihingen, German Federal Republic, and reprinted in Publication No. 52,102 of Kugelfischer Georg Schäfer & Co., the assignee of my present invention.

Despite scrupulous administration of these tests and elimination of rejects incapable of correction by further machining, certain rollers used in high-speed bearings were found to show unexpected wear in the region of their end faces which at first could not be explained. I have found the cause to reside in an eccentricity of the center of gravity of the roller body which gives rise to an unbalance tending to tilt the axis of that body relatively to its axis of rotation within the bearing. If the eccentricity is due to single surface irregularity, the defect can be detected by conventional methods. In many instances, however, the unbalance is the result of a multiplicity of minor deviations, not readily ascertainable by themselves, from exact cylindricity or conicity, parallelism of end faces and other prerequisites. Internal cavities and other structural inhomogeneities below the surface also defy detection.

OBJECT OF THE INVENTION

Since the presence of even a single wear-prone roller may significantly impair the function of an entire bearing and thus jeopardize the operation of an airplane, satellite or other piece of equipment incorporating same, it is the object of my invention to provide a method of enabling the detection of an unbalance in a roller body prior to its assembly into a high-speed journal bearing.

SUMMARY OF THE INVENTION

I realize this object, in accordance with my present invention, by subjecting each roller to high-speed rotation about a spin axis substantially coinciding with the geometrical axis of the roller body, detecting angular deviations of the roller axis from the spin axis, and eliminating rollers for which these deviations exceed a predetermined limit.

BRIEF DESCRIPTION OF THE DRAWING

The above and other features of my invention will now be described in detail with reference to the accompanying drawing in which.

SPECIFIC DESCRIPTION

Figure 1:
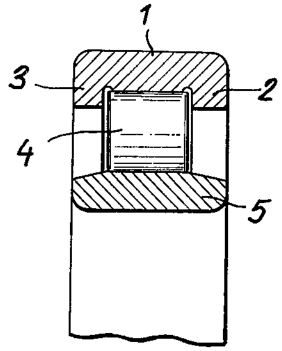
FIG. 1 is a fragmentary cross-sectional view of a roller bearing.
Figure 2:
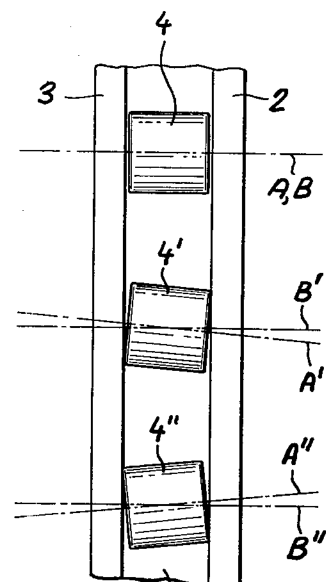
FIG. 2 is a developed view of part of the outer race of the bearing of FIG. 1, showing several rollers thereof.

In FIGS. 1 and 2 I have shown part of a conventional journal bearing comprising an outer race 1 with lateral guide flanges 2 and 3, an inner race 5, and a multiplicity of rollers 4, 4', 4'' held separated by a nonillustrated cage. The rollers are cylindrical and have end faces slightly spaced from flanges 2 and 3. The relative rotation of two members such as a housing and a shaft, respectively secured to races 1 and 5, subjects the rollers 4, 4', 4'' to rotation about axes B, B', B'' parallel to the common axis of these races. With a properly balanced roller, its geometrical axis A will coincide with its axis of rotation B, as illustrated for roller 4. Rollers 4' and 4'', on the other hand, are assumed to be dynamically unbalanced so that their geometrical axes A', A'' are tilted relatively to axes B', B'' during rotation whereby their end faces rub against flanges 2, 3 and undergo nonuniform wear which further enhances the existing eccentricity.

Figure 3:
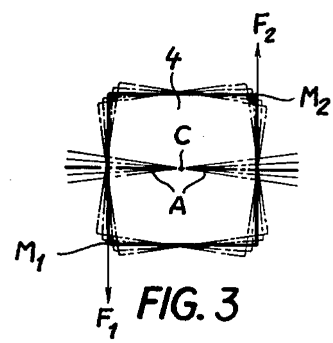
FIG. 3 is a diagrammatic side view of a spinning roller with dynamic unbalance.

By the term "dynamic unbalance" I mean the kind of eccentricity which generates a transverse torque tilting the roller axis as indicated in FIG. 2. This has been illustrated more succinctly in FIG. 3 where a roller 4 has eccentric masses $M_1$ and $M_2$ giving rise to radial forces $F_1$ and $F_2$ which produce aiding torques about the geometrical center C of the roller body. Since the roller is confined between the two coaxial peripheral surfaces of the bearing races, it can swing only in two directions (lying substantially in a plane tangential to the orbit of its axis of rotation) so that its geometrical axis A oscillates between two limiting positions as exaggeratedly indicated in the drawing.

Figure 4:
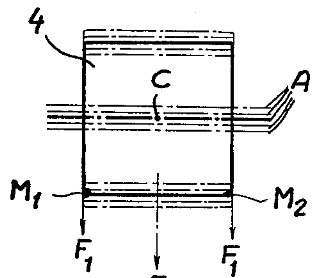
FIG. 4 is a view similar to FIG. 3, showing a roller with static unbalance.

If the eccentricity symbolized by the masses $M_1$ and $M_2$ is so distributed that the resulting force $F_o$ is substantially in line with the center C of the roller body, the roller axis will shift only parallel to itself and thus to the axis of rotation as exaggeratedly illustrated in FIG. 4. This so-called static unbalance does not significantly accelerate the war of the roller and may therefore be disregarded in the selection of roller which otherwise conform to the geometrical requirements of the bearing.

Figure 5:
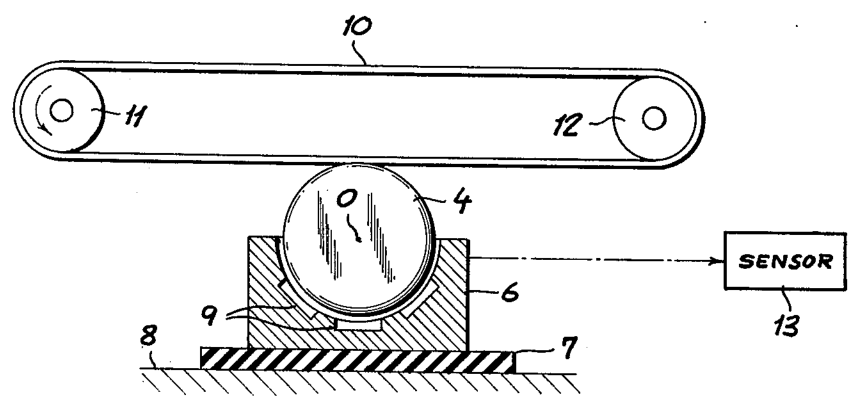
FIG. 5 is a somewhat diagrammatic view of a testing device for detecting an unbalance of a bearing roller.

FIG. 5 schematically represents a testing device, available under the designation FAG MGR 25, which can be used for detecting dynamic unbalances of bearing rollers in accordance with my present invention. The device comprises a semicylindrical bearing cup 6 carried by an elastic mounting, here simply shown as a resilient layer 7, on a supporting surface 8. Pockets 9 in cup 6 communicate with a source of compressed air to form air cushions radially and axially sustaining a roller 4 to be tested. The roller cradled in cup 6 is rotated at high speed by tangential contact with a horizontal stretch of an endless belt 10 wound about pulleys 11, 12, pulley 11 being driven by a nonillustrated motor. If the roller frictionally entrained by the belt is dynamically unbalanced, its axis will angularly deviate from a spin axis 0 parallel to those of pulleys 11,12 and will thus describe a conical surface. Through the intervening air cushions, the gyrations of the rotating roller 4 are transmitted to the air bearing 6, whose rocking motions due to such angular deviations are detected by a sensor 13. The latter may include, for example, a light source emitting a sharp beam upon a reflecting end face of the bearing, the reflected beam impinging upon a photodetector registering tilt angles related to the existing unbalance. With suitable magnification due to an extended light path, or suitable electronic amplification, such a device may detect unbalance torques as low as a few milligram-millimeters. Rollers exhibiting unbalances above a threshold of, say, 0.25 g-mm will be considered rejects unless the defect is readily remediable by machining.

The threshold can be established by measuring the deflection of the beam or equivalent sensing means with a calibrated roller of the proper dimensions subjected to rotation at the same speed in the device of FIG. 5.

I claim:

1. A method of selecting rollers for assembly into high-speed journal bearings, comprising the steps of:

cradling each roller in a generally semicylindrical cup of an air bearing with a horizontal axis;

resiliently mounting said air bearing on a supporting surface;

frictionally entraining each roller at high speed by a horizontal stretch of an overlying endless belt in tangential contact therewith to set the roller in rotation about a spin axis substantially coinciding with said horizontal axis;

measuring rocking motions of said air bearing due to deviations of said spin axis from said horizontal axis; and eliminating rollers for which the extent of said rocking motion exceeds a predetermined limit.

* * * * *